United States Patent [19]

Wilkens

[11] 4,074,732
[45] Feb. 21, 1978

[54] WIRE CUTTING, STRIPPING AND TWISTING TOOL

[76] Inventor: Kenneth A. Wilkens, R.D. No. 2 Box 546, Andover, N.J. 07821

[21] Appl. No.: 756,898

[22] Filed: Jan. 5, 1977

[51] Int. Cl.² .......................................... B21F 15/04
[52] U.S. Cl. ................................ 140/120; 140/123; 7/14.1 R; 81/9.5 R
[58] Field of Search .............. 140/117, 118, 119, 120, 140/123, 149; 81/9.5; 7/14.1 R; 30/90.1; 29/751

[56] References Cited

U.S. PATENT DOCUMENTS

| 1,699,805 | 1/1929 | Ocko | 81/9.5 R |
| 2,949,939 | 8/1960 | Milla | 140/149 |
| 3,131,732 | 5/1964 | Thurston | 140/119 |
| 3,654,647 | 4/1972 | Neff | 81/9.5 R |

Primary Examiner—Lowell A. Larson

[57] ABSTRACT

A unitary multi-purpose tool cuts, strips and twists together wires for example in preparation for the installation of insulating cap-type twist-on wire connectors.

1 Claim, 5 Drawing Figures

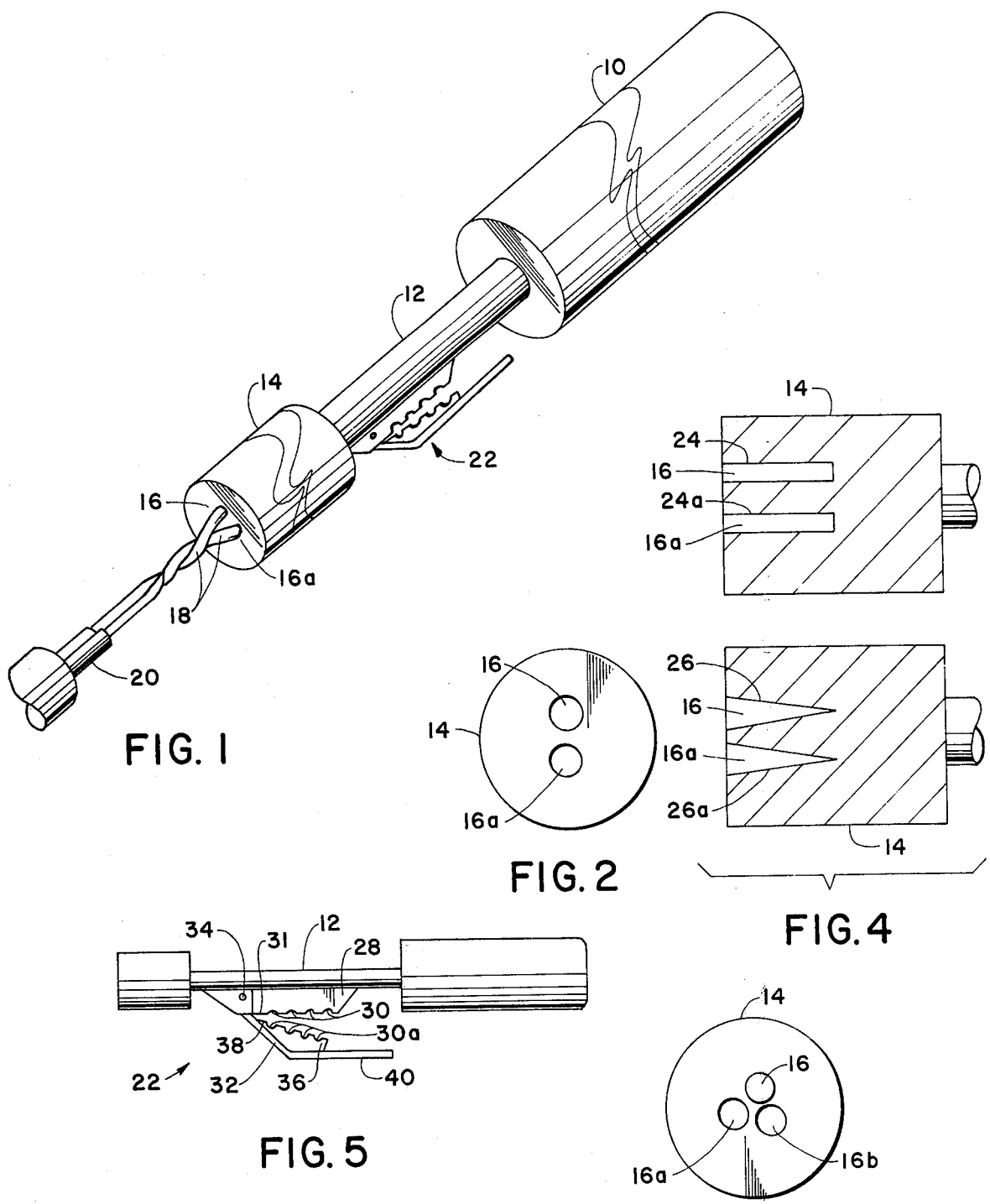

WIRE CUTTING, STRIPPING AND TWISTING TOOL

BACKGROUND OF THE INVENTION

The installation of electrical power wiring frequently uses a method of joining whereby two or more wires are cut to length, the insulation is removed from an end portion of each, the bared conductors are twisted together, and the twisted conductors are held together, and electrically insulated from other objects using a plastic cap having internal threads which is screwed onto the twisted conductors.

The operations of cutting, stripping and twisting, when done with separate tools, consumes considerable time. In addition, the workman is often required to perform these operations while he is in a physically awkward posture.

Disclosures by Davidson, U.S. Pat. No. 1,453,447, and by Allyn, U.S. Pat. No. 3,420,280, describe devices for twisting bared wires together. Numerous cutting and twisting devices, such as disclosed in U.S. Pat. Nos. 1,773,058 and 1,059,281 have been directed to the problem of cutting and twisting of steel wire in construction and in packaging.

The prior art fails to disclose a unitary tool adapted to performing all of the functions required to prepare electrical conductors for the installation of insulating screw-type cap connectors.

SUMMARY OF THE INVENTION

This invention provides a wire twisting tool consisting of a handle and a coaxial head. A plurality of blind holes in the end of the head are adapted to insertion of the bared ends of two or more electrical conductors. A twist of the handle, while holding the unbared portion of the wires from turning, causes the bared ends to twist around each other into a helical bundle.

A wire cutter and wire stripper, provided as an integral part of the tool, enables cutting the wires to length and stripping them of insulation, as well as twisting them together, using only the single tool.

BRIEF DESCRIPTION OF THE DRAWINGS

FIG. 1 shows a perspective view of the tool engaged with a plurality of wires.

FIG. 2 shows an end view of the head of the tool.

FIG. 3 shows an end view of an alternative embodiment of the head.

FIG. 4 shows two cross sectional views of the head taken along 4—4 in FIG. 1.

FIG. 5 shows a side elevational of the tool

DETAILED DESCRIPTION OF THE PREFERRED EMBODIMENT

Referring to the perspective view of the tool in FIG. 1, there is shown a handle 10, connected by a shank 12 to a head 14. The end of the head 14 is provided with a plurality of holes 16, 16a for receiving the bared ends 18 of electrical conductors 20. A cutter and stripper, shown generally at 22 is mounted on the shank 12.

In the end views of the head 14 of FIG. 2 and FIG. 3 are shown two 16, 16a or three 16, 16a, 16b, respectively, circular entrance holes. A larger number of holes 16 or differently shaped holes is not to be construed as departing from the spirit of this invention. For example, a single rectangular slot could substitute for the two circular holes 16, 16a in FIG. 2.

In the cross-sectional view of the head 14, shown in FIG. 4, two alternative internal hole 16 shapes are illustrated. Cylindrical holes 16, 16a having parallel sides 24, 24a tend to grip the wire ends 18 tighter for a tighter twist. Conical sides 26, 26a on the holes 16, 16a grip less tightly but allow the bared ends 18 to slip outward as the twist progresses.

Referring now to FIG. 5, the cutter and stripper 22 is shown attached to the shank 12. The cutter and stripper 22 consists of a base 28 attached, by means well known in the art, to the shank 12. The base 28 has a plurality of semi-circular stripper notches 30 in its edge. The perimeter of each stripper notch 30 is sharpened to enable penetration of wire insulation. The radii of the stripper notches 30 are selected to match the outer radii of popular sizes of wire conductors 18. A sharpened cutter bar 31 is also disposed on the edge of the base 28. An articulated member 32 is articulably attached to the base 28 by an axis 34. The axis 34 may be a rivet, shoulder bolt or other device adapted to allowing the rotation of the articulated member 32 about it. The articulated member 32 contains a stripper bar 36 containing sharpened semi-circular stripper notches 30a which can be brought into opposing relationship to corresponding sized stripper notches 30 on the base 28 by rotation of the articulated member 32 about its axis 34. The articulated member 32 also contains a cutter tooth 38 which can be brought into scissors relationship with the cutter bar 31 on the edge of the base 28. A handle 40 at the end of the articulated member 32 enables rotation of the articulated member 32 about its axis to perform the stripping and cutting action.

When it is desired to connect electrical wires using this tool, each wire is cut to length by placing it between the cutter bar 31 and the cutter tooth 38. When the handle 40 on the articulated member 32 is pressed toward the shank 12, the cutter tooth 38 passes scissors fashion adjacent to the cutter bar 31. The wire and its insulation are severed by the scissors action. The desired amount of insulation is then stripped from the wire by placing the wire in the stripper notch 30 whose radius is correctly sized for the radius of the conductor. When the handle 40 on the articulated member is pressed toward the shank 12, the stripper notches 30a on the articulated member 32 are moved opposite to the similarly sized stripper notches 30 on the edge of the base 28. Each opposing pair of stripper notches 30, 30a forms a circular hole having a sharpened perimeter wherein the diameter of the hole is of the proper size to penetrate and cut through the insulation but too large to cut into the metallic conductor.

Once the desired number of wires is cut and stripped by repeating the operation of the preceding paragraph, the bared ends of the wires 18 are inserted into the holes 16, 16a. The wires are held with one hand while the handle 10 with the attached head 14 is rotated. The bared ends of the wires 18 are thereby twisted together. Once the wires 18 are cut, stripped, and twisted together, a cap-type internally threaded insulating connector well known in the art (not shown) is readily threaded onto the twisted portion.

The handle 10 and shank 12 may contain ratchetable components (not shown) which allow unidirectional rotation of the shank 12 with back-and-forth rotation of the handle. In addition, the handle and shank may contain mating threads similar to those seen in a "Yankee Screwdriver" (not shown) in which a push on the handle 10 causes unidirectional rotation of the shank whereas release of the handle does not cause rotation.

I claim:

1. A hand-held wire cutting and twisting tool comprising:
   a. a generally cylindrical handle member;
   b. a head member generally aligned concentrically with the axis of said handle member and spaced therefrom;
   c. a face on said head member in a plane generally normal to the axis of said handle member;
   d. a generally cylindrical shank concentric with said handle member connecting said handle member to said head member;
   e. at least two blind holes normal to said face and parallel to the axis of said handle member, each of said at least two blind holes being symmetrically offset from the axis of said handle member;
   f. each of said at least two blind holes being adapted to the insertion therein of the stripped end of one wire to be twisted;
   g. said at least two blind holes, in combination with said head member, shank and handle member, being operative to twist together the stripped ends of at least two wires inserted therein when the wires are held and the handle member rotated about its axis;
   h. a fixed cutting and stripping blade rigidly attached to said shank;
   i. a moveable cutting and stripping blade pivotally attached at one of its ends in operatively opposed relationship to said fixed cutting and stripping blade;
   j. a handle on the second end of said moveable cutting and stripping blade;
   k. opposed scissors blade means on said fixed and moveable cutting and stripping blades for cutting through said wires; and
   l. at least one semicircular stripping notch in each of said fixed and moveable cutting and stripping blades, said stripping notches facing each other and together forming a generally circular hole with a sharpened perimeter, said generally circular hole being slightly larger in diameter than the diameter of a wire conductor to be stripped.

* * * * *